United States Patent [19]

Zhurinov et al.

[11] Patent Number: 4,822,584

[45] Date of Patent: Apr. 18, 1989

[54] PROCESS FOR OBTAINING PHOSPHORUS FROM AQUEOUS SUSPENSION OF PHOSPHORUS SLIME

[75] Inventors: Murat Z. Zhurinov; Kappas Kusaiynov, both of Karaganda; Tleubai M. Alzhanov, Alma-Ata; Zhanaly S. Bekturganov, Karaganda; Abduali Baeshov, Karaganda; Asyk-At Z. Zhagufarov, Karaganda; Kanat S. Ibishev, Karaganda; Mukan D. Atabaev; Klim A. Kim, both of Dzhambul, all of U.S.S.R.

[73] Assignee: Institute Organitcheskogo Sinteza I Uglekhimii An Kaz SSR, Karaganda, U.S.S.R.

[21] Appl. No.: 153,496

[22] Filed: Feb. 3, 1988

Related U.S. Application Data

[63] Continuation of Ser. No. 944,932, Dec. 22, 1986, abandoned.

[51] Int. Cl.[4] .................. C01B 25/01; C01B 25/04
[52] U.S. Cl. .................. 423/322; 423/299; 210/907; 204/164; 23/293 R
[58] Field of Search .................. 423/299, 322, 323; 204/164; 23/293 R; 210/907

[56] References Cited

U.S. PATENT DOCUMENTS

| | | | |
|---|---|---|---|
| 3,004,834 | 10/1961 | Harnisch et al. | 23/293 R |
| 3,084,029 | 4/1963 | Barber et al. | 423/316 |
| 3,136,604 | 6/1964 | Barber et al. | 423/323 |
| 3,491,015 | 1/1970 | Naff | 204/164 |
| 3,615,194 | 10/1971 | Reed et al. | 204/164 |
| 3,679,363 | 7/1972 | Skrivan | 204/164 |
| 3,743,700 | 7/1973 | Orr | 423/322 |
| 4,000,245 | 12/1976 | Fey | 204/164 |
| 4,192,853 | 3/1980 | Cherndgorenko et al. | 423/122 |
| 4,229,307 | 10/1980 | Lowe et al. | 204/164 |
| 4,451,277 | 5/1984 | Barber | 423/323 |
| 4,462,973 | 7/1984 | Crea et al. | 423/322 |
| 4,478,633 | 10/1984 | Chernogorenko et al. | 71/37 |
| 4,595,492 | 6/1986 | Crea et al. | 210/907 |
| 4,690,752 | 9/1987 | Shaw | 210/907 |

*Primary Examiner*—Anthony McFarlane
*Attorney, Agent, or Firm*—Burgess, Ryan & Wayne

[57] ABSTRACT

A process for obtaining phosphorus from an aqueous suspension of a phosphorus slime comprising subjecting the aqueous suspension to at least one electric discharge of an energy of from 20 to 180 J as calculated per kg of the phosphorus slime in a DC electric field, or the aqueous suspension of the phosphorus slime is subjected to the effect of an AC electric field with a power of 85-250 W. The process is conducted at a temperature not below the melting point of phosphorus.

5 Claims, No Drawings ations to the entire mass of the aqueous suspension, i.e. ensures vibration of its particles having different density, thus facilitating destruction of the phosphorus

PROCESS FOR OBTAINING PHOSPHORUS FROM AQUEOUS SUSPENSION OF PHOSPHORUS SLIME

This application is a continuation of application Ser. No. 944,932, filed Dec, 22, 1986, now abandoned.

BACKGROUND OF THE INVENTION

Known in the art is a process for obtaining phosphorus from a phosphorus slime (cf. U.S. Pat. No. 3,004,834 Cl. 23-293).

The process is effected by bubbling a stream of an overheated steam at a temperature of from 162° to 172° C. under a pressure of from 6 to 8 atm through the phosphorus slime. The overheated steam is fed through steam needles or bubbling rings. A mixture of water vapours and phosphorus is cooled in tubular condensers. Phosphorus in the form of a liquid phase flows into a special collecting vessel. The process duration is 60 to 120 hours. The yield of phosphorus is 99.5% by mass. The process productivity in a single unit is 2.5 t of phosphorus a day.

The process features a low product output, a high power consumption rate (18–20 kg of steam per 7 kg of the resulting phosphorus) and high rates of corrosion of the equipment.

Also known is a process for producing phosphorus from an aqueous suspension of a phosphorus slime which is subjected to the effect of a DC electric field in a two-section electrophoretic electrolyzer (cf. USSR Inventor's Certificate No. 1039982, C 25 B 7/00, 07.06. 1980). Basic requirements of the process are maintaining temperature surpassing the melting point of phosphorus, pH of the medium=2-3, electric field intensity—not below 35V/cm. When these requirements are observed, impurities pass into a cathode chamber, whereas in an anode chamber yellow phosphorus remains. The yield of phosphorus is 99% by mass. The process productivity is 9 g/h.

This process is characterized by the necessity of a continuous control of its parameters (keeping the required pH, electric field intensity, continuous heat removal from the reaction zone) and by a low productivity.

A combination of the above-mentioned disadvantages has resulted in impossibility of implementation of the process on a commercial scale.

OBJECT OF THE INVENTION

It is an object of the present invention to provide a process for obtaining phosphorus from an aqueous suspension of a phosphorus slime which would ensure a high productivity of the process at a high yield of the desired product.

SUMMARY OF THE INVENTION

This object is accomplished by a process for obtaining phosphorus from an aqueous suspension of a phosphorus slime in a DC electric field, wherein, according to the present invention, the aqueous suspension is subjected to the effect of at least one electric discharge with a power of 20–180 J as calculated per kg of the phosphorus slime.

When the process is conducted under the above-mentioned conditions, the structure of the phosphorus slime is broken down with a fraction of a second thus resulting in a substantially full recovery of elemental phosphorus therefrom. Owing to this fact, the process has a productivity of up to 43 t/h which is considerably superior to that of the prior art processes discussed hereinbefore.

To perform the process at a high productivity, it is preferable to apply electric discharges at a frequency of 3 to 12 discharges per second.

The object of the present invention is accomplished also by a process for obtaining phosphorus from an aqueous suspension of a phosphorus slime, wherein, according to the present invention, the aqueous suspension of the phosphorus slime is subjected to an AC electric field with a power of 85–250W. This electric field causes vibration of the aqueous suspension particles having different density which results in breaking down of the slime structure with a substantially full recovery of elemental phosphorus therefrom within a short period of time. For this reason, the process also has a high productivity.

To intensify the process and ensure the required productivity, it is advisable to maintain a rate of supply of the aqueous suspension of the phosphorus slime subjected to the effect of an AC electric field within the range of from 1 to 8.5 kg/s.

DETAILED DESCRIPTION OF THE INVENTION

The process according to the present invention is effected in the following manner.

An aqueous suspension of a phosphorus slime is subjected to at least one electric discharge in a DC electric field. The process is conducted at a temperature not below the melting point of phosphorus at a power of the electric discharge equal to 20–180 J. The phosphorus slime consists of finely-divided phosphorus stabilized by means of an organic film and of mineral particles. Upon the effect of an electric discharge on the aqueous suspension of the phosphorus slime shock waves are formed which propagate within the suspension volume. The aqueous suspension consists of different-density components which causes different speed of propagation of shock waves. The originating pressure gradient ensures a full destruction of the phosphorus slime and separation of elemental phosphorus from other components. Elemental phosphorus precipitates on the vessel bottom. After decantation it is delivered to the customer. The range of power values of a single electric discharge is defined by the yield of phosphorus and time of decantation. At a power value of less than 20 J the yield of elemental phosphorus is lowered, whereas at a power value of above 180 J the time of phosphorus decantation is sharply extended due to its presence in an emulsified state. The process according to the present invention is applicable to processing slimes with substantially any content of phosphorus and of any time since their preparation.

Regarding the required productivity of the process, it is advisable to apply electric discharges to the aqueous suspension of the phosphorus slime at a frequency of from 1 to 12 discharges per second. We also suggest a process, wherein an aqueous suspension of a phosphorus slime is subjected to the action of an AC electric field of a power of from 85 to 250W at a temperature not below the melting point of phosphorus.

Alternating current (AC) imparts frequent oscill slime with the fullest degree of recovery of elemental phosphorus therefrom. The yield of phosphorus is as high as 99.5% by mass.

At an AC power of less than 85W the yield of elemental phosphorus does not exceed 86% by mass which is economically inefficient in commercial implementation of the process. At AC power values above 250W the process becomes power-consuming and features a long-time decantation of phosphorus from the reaction mixture.

The process can be performed either continuously, or discontinuously. In the continuous embodiment of the process a rate of supply of the aqueous suspension of the phosphorus slime subjected to the effect of an AC electric field is within the range of from 1 to 8.5 kg/s. At a supply rate of the aqueous suspension of less than 1 kg/s the process productivity becomes insignificant, while at a supply rate of above 8.5 kg/s the time of residence of the phosphorus slime in the electric field is insufficient to fully recover elemental phosphorus therefrom.

Some specific examples illustrating the process according to the present invention are given hereinbelow.

EXAMPLE 1

Charged into a vessel are 20 t of an aqueous suspension of a 72% phosphorus slime at the ratio of slime:water=1:1. To the aqueous suspension of the phosphorus slime 10,000 electric discharges are applied in a DC electric field at the frequency of 1 discharge per second. The energy of a single discharge is 20 J. The process temperature is 47° C. On completion of application of electric discharges elemental phosphorus precipitates onto the vessel bottom. The time of decantation is 1.5 h. The yield of elemental phosphorus is 99% by mass. The process productivity is 30.6 t/h.

EXAMPLE 2

Charged into a vessel are 20 t of an aqueous suspension of a 72% phosphorus slime at the ratio of slime:water=1:1. To the aqueous suspension of the phosphorus slime 10,000 electric discharges are applied in a DC electric field with the frequency of q discharge per second. The energy of a single discharge is 180 J. The process temperature is 47° C. On completion of application of electric discharges elemental phosphorus precipitates onto the vessel bottom. The decantation duration is 8 hours. The yield of elemental phosphorus is 99.5%. The process productivity is 30.6 t/h.

EXAMPLE 3

Charged into a vessel are 20 t of an aqueous suspension of a 75% phosphorus slime at the ratio of slime:water=1:1. To the aqueous suspension of the phosphorus slime 10,000 electric discharges are applied in a DC electric field at the frequency of 12 discharges per second. The energy of a single discharge is 20 J. The process temperature is 47° C. On completion of application of electric discharges elemental phosphorus precipitates onto the vessel bottom. The decantation duration is 1.5 hours. The yield of elemental phosphorus is 99% by mass. The process productivity is 43.2 t/h.

EXAMPLE 4

Charged into a vessel are 20 t of an aqueous suspension of a 48% phosphorus slime at the ratio of slime:water=1:1. To the aqueous suspension of the phosphorus slime 10,000 electric discharges are applied in a DC electric field with the frequency of 5 discharges per second. The energy of a single discharge is 90 J. The process temperature is 47° C. On completion of application of electric discharges elemental phosphorus precipitates onto the bottom of the vessel. The time of decantation is 1.5 hours. The yield of elemental phosphorus is 99.5% by mass. The process productivity is 18 t/h.

EXAMPLE 5

Charged into a vessel are 20 t of an aqueous suspension of a 59% phosphorus slime at the ratio of slime:water=1:1. To the aqueous suspension of the phosphorus slime 10,000 electric discharges are applied in a DC electric field at the frequency of 5 discharges per second. The energy of a single discharge is 90 J. The process temperature is 47° C. On completion of application of electric discharges elemental phosphorus precipitates on the vessel bottom. The time of decantation is 1.5 hour. The yield of elemental phosphorus is 99.5% by mass. The process productivity is 18 t/h.

EXAMPLE 6

Charged into a vessel are 15 t of an aqueous suspension of a 72% phosphorus slime at the ratio of slime:water=1:0.5. To the aqueous suspension of the phosphorus slime 10,000 electric discharges are applied in a DC electric field with the frequency of 5 discharges per second. The energy of a single discharge is 20 J. The process temperature is 47° C. On completion of application of electric discharges elemental phosphorus precipitates on the vessel bottom. The time of decantation is 1.5 hours. The yield of elemental phosphorus is 99% by mass. The process productivity is 18 t/h.

EXAMPLE 7

Charged into a vessel are 20 t of an aqueous suspension of a 72% phosphorus slime at the ratio of slime:water=1:1. To the aqueous suspension of the phosphorus slime 50,000 electric discharges are applied in a DC electric field with the frequency of 5 discharges per second. The energy of a single discharge is 20 J. The process temperature is 51° C. On completion of application of electric discharges elemental phosphorus precipitates on the vessel bottom. The decantation duration is 6 hours. The yield of elemental phosphorus is 99% by mass. The process productivity is 30.6 t/h.

EXAMPLE 8

The process is effected continuously. Treated are 2 t of an aqueous suspension of a 75% phosphorus slime at the ratio of slime:water=1:1. To the aqueous suspension of the phosphorus slime an AC electric field is applied with the power of 85W. The rate of supply of the aqueous suspension is 1 kg/s. The process is conducted for 33.5 minutes at the temperature of 54° C. The time of decantation of elemental phosphorus is 2 hours. The yield of elemental phosphorus is 99.5% by mass. The process productivity is 30.6 t/h.

EXAMPLE 9

The process is conducted continuously. Treated are 2 t of an aqueous suspension of a 72% phosphorus slime at the ratio of slime:water=1:1. To the aqueous suspension of the phosphorus slime an AC electric field with the power of 85W is applied. The rate of supply of the aqueous suspension is 8.5 kg/s. The process is conducted for 3.9 min at the temperature of 54° C. The time of decantation of elemental phosphorus is 2 hours. The product yield is 99.5% by mass. The process productivity is 30.6 t/h.

EXAMPLE 10

The process is effected continuously. Treated are 2 t of an aqueous suspension of a 72% phosphorus slime at the ratio of slime:water=1:1. To the aqueous suspension of the phosphorus slime an AC electric field of the power of 250W is applied. The rate of supply of the aqueous suspension is 4 kg/s. The process is carried out for 8.3 min at the temperature of 54° C. The time of decantation of elemental phosphorus is 7 hours. The yield thereof is 98.5% by mass. The process productivity is 14.4 t/h.

EXAMPLE 11

The process is conducted continuously. Treated are 2 t of an aqueous suspension of a 61% phosphorus slime at the ratio of slime:water=1:1. To the aqueous suspension of the phosphorus slime an AC electric field is applied with the power of 145W. The rate of supply of the aqueous suspension is 4 kg/s. The process is conducted for 8.3 minutes at the temperature of 54° C. The time of decantation of elemental phosphorus is 2 hours. Its yield is 99.5% by mass. The process productivity is 14.4 t/h.

EXAMPLE 12

The process is carried out continuously. Treated are 2 t of an aqueous suspension of a 44% phosphorus slime at the ratio of slime:water=1:1. To the aqueous suspension of the phosphorus slime an AC electric field of the power of 145W is applied. The rate of supply of the aqueous suspension is 4 kg/s. The process is conducted for 8.3 minutes at the temperature of 54° C. The time of decantation of elemental phosphorus is 2 hours. Its yield is 99% by mass. The process productivity is 14.4 t/h.

EXAMPLE 13

The process is carried out continuously. Treated are 1.5 t of an aqueous suspension of a 72% phosphorus slime at the ratio of slime:water=1:0.5. To the aqueous suspension of the slime an AC electric field of the power of 145W is applied. The rate of supply of the aqueous suspension is 4 kg/s. The process is conducted for 6 minutes at the temperature of 54° C. The time of decantation of elemental phosphorus is 2 hours. The yield of phosphorus is 99.5% by mass. The process productivity is 14.4 t/h.

EXAMPLE 14

The process is carried out continuously. Treated are 1.5 t of an aqueous suspension of a 72% phosphorus slime at the ratio of slime:water=1:0.5. To the aqueous suspension of the phosphorus slime an AC electric field of the power of 160W is applied. The rate of supply of the aqueous suspension is 5 kg/s. The process is conducted for 5 minutes at the temperature of 48° C. The time of decantation of elemental phosphorus is 2 hours. The yield of phosphorus is 99.5% by mass. The process productivity is 18 t/h.

EXAMPLE 15

The process is carried out continuously. Treated are 12 t of an aqueous suspension of a 72% phosphorus slime at the ratio of slime:water=1:1. To the aqueous suspension of the phosphorus slime an AC electric field of the power of 160W is applied. The rate of supply of the aqueous suspension is 9 kg/s. The process is conducted for 22 minutes at the temperature of 47° C. The time of decantation of elemental phosphorus is 6 hours. The yield of phosphorus is 99% by mass. The process productivity is 29 t/h.

What is claimed is:

1. A process for recovering phosphorus from an aqueous phosphorus slime which comprises:
   providing phosphorus slime in a treating zone at a temperature above the melting point of phosphorus; passing at least one direct current electric discharge through the phosphorus slime, to provide 20 to 180 Joules of energy per Kilogram of slime whereby phosphorus is separated from the slime; and recovering the separated phosphorus 2. A process of claim 1 wherein the electric discharge is passed through the phosphorus slime at a rate of 1 to 12 discharges per second.

3. A process of claim 2 wherein the electric discharge is passed through the aqueous slime at from 3 to 12 discharges per second.

4. A process for recovering phosphorus from an aqueous phosphorus slime which comprises:
   providing phosphorus slime in a treating zone at a temperature above the melting point of phosphorus; applying an alternating current electric field of from 85 to 250 watts to the phosphorus slime in the treating zone, whereby the phosphorus separates from the slime; and recovering the separated phosphorus.

5. A continuous process of claim 4 wherein the phosphorus slime is continuously introduced into the treating zone at a rate of from about 1 to 8.5 Kg/sec of aqueous phosphorus slime.

* * * * *